Patented Dec. 7, 1948

2,455,445

UNITED STATES PATENT OFFICE 2,455,445

GEL CATALYST

Melvin J. See and James C. Bailie, Chicago, Ill., assignors to Standard Oil Company, Chicago, Ill., a corporation of Indiana No Drawing. Application July 22, 1944, Serial No. 546,231

11 Claims. (Cl. 252—259)

This invention relates to the preparation of catalysts and more particularly to a method of drying catalysts which are prepared in the form of hydrogels. Still more particularly the invention relates to the drying of spherical particles of hydrogels to produce catalysts having discrete particles of rounded or spheroidal shape substantially without agglomeration.

One object of the invention is to effect the drying or dehydration of spheroidal catalyst gel particles in an economic manner without rupture or distortion of the surface, thereby producing a catalyst having a higher physical strength and higher resistance to attrition than when dried in the ordinary manner. Another object of the invention is to effect the drying of catalyst gel particles of small size without loss of catalytic activity frequently encountered in the methods of drying previously employed in the art. A further object of the invention is to prepare silica and silica-alumina catalysts in the form of discrete, rounded, smooth gel particles combining great physical strength and high activity for hydrocarbon conversion, obtainable by a high alumina content in the case of the silica-alumina catalyst. Other objects of the invention will be apparent from the following description thereof.

Heretofore it has been the practice in preparing catalysts from gels, for example silica hydrogel or alumina hydrogel, to coagulate the gel in a mass which may be dried directly or after cutting into irregular pieces and washing with water or other washing liquids. On drying wet massive hydrogels of this type, generally by standing in dry air or gently heating in a ventilated oven, stresses of considerable magnitude are developed in the gel which induce fracturing of the pieces or mass so that the final dried gel product is a granular material having a considerable range of particle size from small lumps down to a very fine powder. It has heretofore been the practice to grade such catalyst by screening and/or grinding if necessary, generally after ignition to a high temperature. The particles of catalyst prepared in this way still possess strains which eventually result in their fragmentation into smaller particles during use which eventually render the catalyst useless for further service, partly because of the difficulty of handling and recovering them and partly because of their unavoidable loss from the apparatus. The exceedingly fine particles pass thru cyclone separators and even thru electrical precipitators.

By our process we prepare the catalyst gel particles in rounded or spheroidal form by the coagulation of individual droplets of a sol in a supporting fluid medium and thus avoid the development of internal strains because the particles have a uniform structure and symmetrical form and are too small to develop strains. Since each particle of gel is coagulated separately out of contact with other masses of gel or any other solid surface, it becomes surrounded by a smooth, glassy surface which has a natural, generally symmetrical, orientation with respect to the particle, thereby tending to strengthen the particle and increase its resiliency and resistance to abrasion and rupture. As a result when this catalyst is used in systems wherein it is maintained in a turbulent fluidized state, there is a minimum loss of energy in the catalyst mass due to friction between the catalyst particles. Likewise the life of the catalyst is greatly increased as a result of the resistance to comminution by abrasion, and wear of the apparatus is also reduced.

In preparing catalyst in spheroidal form by our process, a suitable sol, usually a metal oxide sol, is prepared in metastable form and dispersed in a coagulated liquid wherein droplets are produced which rapidly coagulate into spheroidal particles of gel. Various methods may be employed for carrying out this part of the process. Thus the sol, for example silica sol produced by the rapid mixing of sodium silicate solution and a strong acid such as hydrochloric or sulfuric acid, may be formed into droplets by a spray or distributor either beneath the surface or above the surface of the coagulating bath. If fine streams of the sol are introduced below the surface of the bath, for example an oil bath, they will break up into droplets of more or less uniform size depending on the surface tension, density, and viscosity of the oil and the sol, the size of the sol stream, coarseness of spray, degree of agitation, and other factors.

Alumina sols, iron oxide sols, chromium oxide sols, and various other sols may be employed for preparing catalysts of the corresponding oxides. In the preparation of alumina-silica catalysts we have found it advantageous to prepare a silica-alumina sol from a mixed solution of a silicate and an aluminate. By this technique it is possible to prepare gel particles of higher alumina content without loss in physical strength. Thus, when using the standard method of preparation by mixing sodium silicate and sulfuric acid containing aluminum sulfate we have found it impossible to prepare a spherical catalyst containing more than 8% alumina. When attempts to prepare catalysts containing higher percentages of alumina were made, the catalyst, when dried, crumbled to a powder.

When using sodium aluminate and sodium silicate or sodium aluminate, sodium silicate and sulfuric acid, it is possible to make a catalyst containing high percentages of alumina which retains its spherical shape after drying and calcining in the muffle furnace. Using this procedure we have prepared a catalyst containing 10% alumina. The procedure is as follows: 125 volumes of sodium aluminate solution (40 gms./liter) is mixed into 150 volumes of sodium silicate solution (10 liters of N Brand in 17.5 liters of water). This mixture is immediately mixed into 210 volumes of acid solution (560 cc. of 96% $H_2SO_4$ diluted to 17,000 cc.). The resulting sol has a pH of 3.8 and a setting time of 2 hours. The setting time can be shortened or lengthened by decreasing or increasing the amount of acid solution. The percentage of alumina is increased by increasing the amount of sodium aluminate and the amount of acid.

The sol is passed through an orifice plate or a spray nozzle into a mineral oil containing 1% amyl alcohol and saturated with ammonia, to form spheres. The type of oil and the size of the orifice plate or nozzle used controls the size of the spheres. After the spheres are made they are allowed to stand in dilute ammonia overnight and then washed sulfate free. They are dried in a steam oven at 180° F. and then heated slowly in a muffle furnace (50° F. every ½ hour) to 1100° F. holding there for three hours.

Analysis for alumina content showed 9.86, 9.86 and 9.98% on three check tests.

The coagulating medium employed to support the sol droplets during gelation may be a mineral oil, such as naphtha, kerosene, gas oil, light and heavy lubricating oils such as mineral seal and neutral oils, and other oils including the vegetable and animal oils, soy bean oil, cottonseed oil, castor oil, fish oil, etc. In a like manner we may use incompleted water-miscible organic liquids for the purpose, for example amyl alcohol, amyl acetate, butylamine and amylamine, nitrobenzene, aniline, pentasol, butylalcohol, dibutyl ether, diethyl and dibutyl phthalate, ethyl acetate, furfural, methylethylketone, and other incompletely water-miscible ketones, aldehydes, alcohols, esters or ethers, nitro compounds, halogen derivatives, amines and mixtures thereof. Certain of the liquid fatty acids, such as oleic acid, may also be employed.

In order to facilitate the coagulation of the sol, various coagulating agents may be added to the liquid coagulating bath. Thus we may employ ammonia or amines in the bath when coagulating silicic acid sols. Acids such as acetic and butyric may be employed for speeding the coagulation of basic sols such as aluminates, chromates, etc. Where the bath is a mineral oil, with low solubility for ammonia, we may emulsify aqueous ammonia in the oil. The depth of the coagulating bath should be sufficient to effect at least a partial coagulation of the droplets of sol to provide a surface or envelop of coagulated gel around each particle before reaching the bottom so that the particles of gel may thereafter be handled without rupture of agglomeration.

If desired, the gel particles formed in the coagulating bath may be allowed to fall into a layer of water or aqueous solution below the coagulating bath and the particles of catalyst may be further coagulated by the action of acids, bases or salts contained in the water. The water layer may also be simultaneously employed to wash the catalyst hydrogel particles free of undesirable reagents, salts or other by-products of the reaction by which they are produced. When washing is necessary it may be accomplished by countercurrently passing a stream of the catalyst hydrogel particles thru a current of fresh water, for example distilled water in a suitable contacting column. In the case of certain catalysts such as alumina gels produced from substantially salt-free sols which may be prepared by the action of water or weak acid on amalgamated aluminum metal, no washing of the gel particles is required. It may be desirable here to dispense entirely with the use of a water layer below the coagulating bath, in which case the catalyst gel particles are mechanically separated from the coagulating bath and are then ready for drying.

Having prepared the catalyst in the form of discrete spherical particles of hydrogel, it is then necessary to remove from them the water of which the hydrogel is largely composed. Thus at this stage the catalyst hydrogels will ordinarily contain about 75 to 95 per cent of water, removal of which has heretofore constituted a difficult problem. If it is attempted to dry the catalyst in the usual way by heating in an oven, it is found that the particles agglomerate into masses or clusters which are difficult to break up. When such catalyst masses are broken up or disintegrated to free the individual particles, it is found that the particles produced in this way are misshapen and weakened by unsymmetrical, distorted, and non-spheroidal surfaces resulting in subsequent disintegration in use. Furthermore, such catalyst masses cannot be broken up into individual practices without destruction of a great many of the particles with the production of ultrafine material which it is desired to avoid.

We have now discovered that catalyst prepared in the form of hydrogel particles can be successfully dried without agglomeration or blemish by initially treating them under controlled conditions with an organic liquid having a substantial dissolving power for water, after which they can be dried in the usual manner. Suitable liquids for the purpose are the alcohols such as methyl and ethyl alcohol, propyl, butyl and amyl alcohols, ketones such as acetone and methylethylketone, aldehydes such as furfural and the acetals, polyhydroxyalcohols such as ethylene glycol and glycerol, halohydrins, for example ethylene chlorhydrin, amino compounds, particularly butyl and amyl amines, esters such as ethyl acetate, and commercial alcohol mixtures such as the pentasols. In general, liquids suitable for the purpose have a dissolving power for water of at least 1% at 20° C. up to complete miscibility.

In applying the treatment to hydrogel particles, it is important to avoid overtreatment leading to the production of soft aerogel type gels. The time of treatment cannot be specified sharply because it varies widely with conditions. Solvents of low molecular weight and low viscosity, for example methanol, which are miscible with water in all proportions, i. e. infinitely soluble, must be used with care to prevent the formation of aerosols which occurs by action of the solvent diffusing into the hydrogel particle, the solvent being substituted for water therein. If this occurs, proper shrinkage of the hydrogel particles fails to take place and the product is a soft gel of low density having little mechanical strength. The formation of soft, weak gels of this type largely defeats the purpose of this invention which is to produce catalysts of high physical strength and high resistance to abrasion and attrition.

Other factors which affect the time of immersion of the hydrogel particles in the deglomerating solvent are the temperature, the water solubility of the solvent, the rate of agitation of the particles in the solvent, the water concentration in the solvent, the water content of the hydrogel and the size of the hydrogel particles. In the ordinary procedure where the catalyst produced has a particle size within the range of about 50 to 250 mesh, an immersion time of about one-half minute to 15 minutes is satisfactory with acetone as the solvent. A longer time, for example 2 to 4 hours, may be employed with solvents of higher viscosity and lower water solubility such as amyl alcohol. When the solvent treatment is carried out at a higher temperature than ordinary temperature, for example 150 to 200° F., the time of treatment may be reduced to a matter of seconds, for example 5 to 10 seconds. The duration of treatment may be regulated to remove from the hydrogel from 5 to 25 per cent of the water contained therein, exclusive of extraneous water adhering to the outside of the gel particles. In general, the removal of about 10 to 15 per cent of water is sufficient to render the gel particles non-agglomerating. Although the amount of water removed by the treatment is relatively small, the surface layers appear to be dehydrated leaving the particles in a non-adhering form. It is important, as previously indicated, to regulate the time and conditions of treatment to effect the desired dehydration and shrinkage of the hydrogel without permitting diffusion of the solvent thereinto.

When properly conducted, the deglomerating treatment effects substantially no decrease in density of the finished gel product and may actually result in a slight increase in density as shown by the following data: A spheroidal gel of 40 to 50 mesh when dry, was prepared by the above technique from sol droplets suspended in a water-immiscible medium. After washing the hydrogel, excess water was withdrawn by a suction filter and a portion was dried in an oven at 180° F. overnight. The remainder was dispersed in an equal volume of acetone by shaking for 5 minutes, then filtered off and dried overnight in the oven with the first portion. Both portions were then ignited in a muffle, the temperature being raised 50° F. at thirty-minute intervals until a temperature of 1100° F. was reached where it was held for three hours, then cooled. The gel which had been treated with acetone was in a loose, friable mass easily separated into individual spheroidal particles with smooth, unblemished surface while the other portion not acetone-treated formed a much harder agglomeration which, on crushing, yielded particles of fractured, heterogeneous structure and clusters difficult to separate. The article densities were:

Acetone treated _____ 1.112
No treatment _____ 1.070

When the same hydrogel was allowed to stand for a longer period up to several hours in acetone or alcohol, the density of the dry product was less than 0.9 and as low as 0.18.

The term "deglomerate" is used herein to mean the breaking up of agglomerates or masses of agglomerated particles. The term "deglomerating treatment" refers herein to treatment with a nonagglomerating solvent or a solvent which has the power to break up agglomerates such as agglomerated masses of spheroidal particles held together by interparticle capillary water.

As an example of our catalyst hydrogel drying method, freshly prepared hydrogel spheroidal hydrogel particles, after thorough water washing, are placed on a suction filter for a half hour to remove most of the excess water. The removal of excess water capillarily adhering to the hydrogel assists greatly in obtaining rapid contact and dispersion in the deglomerating medium. This water can be readily abstracted by placing the wet gel mass on a suction filter or by whizzing in a centrifuge, using care to avoid rupturing the particles. In the case of some gels such as $Al_2O_3$ gel prepared from sol from amalgamated aluminum metal, washing may be dispensed with. The wet hydrogel is rapidly agitated in a container with an equal volume of acetone. Gentle agitation can be supplied by shaking or churning, care being taken to avoid disintegration of the soft hydrogel particles. After about five minutes the suspension of hydrogel in acetone is transferred to a suction filter where the acetone is quickly removed and the particles are held on the filter for about one hour to complete the removal of acetone. Some shrinkage of the hydrogel particles occurs in the operation apparently by syneresis of water but substantially no substitution of acetone for water occurs in the limited time of exposure. If the hydrogel is allowed to age from a few hours to several days, syneresis ceases and less dilution of the solvent results.

The gel may next be dried in a hot air stream or it may be put thru a screen to remove any aggregates and break up any clusters which have escaped deglomeration in the acetone bath. The product is then placed in an oven to dry. A drying oven temperature of 150 to 200° F. is usually satisfactory although a higher temperature can sometimes be used. After drying, the product was given an attrition test to determine the extent of agglomerates remaining and a screen analysis before and after the attrition test showed only 2% of agglomerates as compared with more than 50% of agglomerates when the hydrogel is dried in the usual manner, for example by oven drying or tray drying without the deglomerating treatment. The attrition test referred to is one in which a sample of the catalyst material is recycled thru two air jets impinging at high velocity.

Although our invention is generally applicable to the preparation of catalyst gel particles of various sizes, in smooth rounded or spheroidal form, the process is especially adapted to the preparation of a fine catalyst suitable for suspension in gases or vapors in fluidized catalyst operations. In such operations as in the conversion of hydrocarbons, cracking of gas oil, etc., to produce gasoline, where the catalyst is maintained in suspension by an upflowing stream of gases or vapors undergoing reaction, it is generally desirable to employ a catalyst having a particle size of about 50 to 250 mesh.

Catalyst coarser than 50 mesh is not so readily maintained in fluidized form except when a considerable amount of finer catalyst is also present. If the particle size is appreciably finer than 250 to 300 mesh, there is difficulty in recovery. When employed in upflow reactors as in the conversion or cracking of hydrocarbons for the formation of gasoline and other petroleum products, it is generally desirable to employ upflow vapor velocities of the order of 0.2 to 4 feet per second and a catalyst density of about 0.3 to 0.8 of the density of the catalyst at rest. Relative weight velocity may be about 0.4 to 10 lbs. feed per hour per lb. catalyst in the reactor depending on the size of the catalyst particles, temperature and other factors. For hydrocarbon conversion, a temperature of about 850 to 1100° F. is usually used. The partially spent catalyst withdrawn from the reactor is stripped of hydrocarbons by means of steam or other vapor and is then regenerated by oxidation with an oxygen-containing gas at about 900–1200° F. to remove deposits of carbon, after which it can be used again repeatedly. The symmetrical strain-free structure of our catalyst contributes to long life and minimum degradation from frequent heating and recycling.

Having thus described our invention what we claim is:

1. The method of drying gels in the form of discrete unblemished spheroidal particles by abstraction of water from spheroidal particles of an inorganic hydrogel having a strong tendency toward agglomeration which comprises dispersing said hydrogel particles in an organic deglomerating liquid consisting essentially of neutral organic solvent having a dissolving power for water to the extent of at least 1 per cent at 20° C., removing the hydrogel from the liquid after about 5 to 15 per cent of water has been abstracted therefrom by said liquid, and before any substantial degenerating diffusion of said liquid into said gel has occurred and thereafter completing the drying of said gel by evaporation of water therefrom substantially without agglomeration.

2. The process of claim 1 wherein water capillarily adhering to said hydrogel is removed before dispersion in said deglomerating liquid.

3. In the process of making a silica-alumina gel catalyst in the form of discrete, smooth spheroids wherein said spheroids are prepared from a metastable sol by mixing an acid with a solution of an alkali silicate and an alkali aluminate in combination, sufficient acid being employed to reduce the pH below about 5, and dispersing said sol in the form of droplets in an immiscible liquid coagulating bath wherein the said droplets are converted to spheroidal particles of hydrogel of alumina and silica having a tendency to agglomerate on drying, the improved method of drying said particles which comprises separating said hydrogel from said coagulating bath, then, to prevent agglomeration in subsequent drying, treating it with a water-miscible, substantially netural organic liquid for a time sufficient to extract from about 5 to 25 per cent of the water contained in said gel and thereafter completing the drying of said gel by evaporation of the remaining water.

4. In the process of preparing gel catalysts in the form of hard, smooth, rounded, discrete particles from spheroidal particles of inorganic hydrogel which tend to agglomerate on drying, said hydrogel having been prepared by coagulation of droplets of a suitable inorganic sol, the improvement comprising removing water from said hydrogel by contacting with a deglomerating liquid consisting essentially of a substantially neutral organic solvent having a dissolving power for water contained in said hydrogel of at least about 1% at 20° C., maintaining contact between said deglomerating liquid and said hydrogel until about 5 to 25 per cent of water has been removed from said gel, interrupting the contact with said deglomerating liquid before any substantial diffusion of said liquid into said hydrogel has taken place, removing adhering deglomerating liquid from said hydrogel particles and drying the product substantially without agglomeration.

5. The process of claim 4 wherein the deglomerating liquid is a water-soluble alcohol.

6. The process of claim 4 wherein the deglomerating liquid is ethyl alcohol.

7. The process of claim 4 wherein the deglomerating liquid is a water-soluble ketone.

8. The process of claim 6 wherein the deglomerating liquid is acetone.

9. The process of claim 4 wherein the deglomerating liquid is a water-soluble amine.

10. The process of claim 4 wherein the hydrogel particles are agitated sufficiently in the presence of said deglomerating liquid to break up clusters of said particles before separating from said liquid.

11. The process of claim 4 wherein any water capillarily adhering to said hydrogel is removed before contacting it with said deglomerating liquid.

MELVIN J. SEE.
JAMES C. BAILIE.

REFERENCES CITED

The following references are of record in the file of this patent:

UNITED STATES PATENTS

| Number | Name | Date |
|---|---|---|
| 1,755,496 | Behrman | Apr. 22, 1930 |
| 1,835,420 | Neundlinger | Dec. 8, 1931 |
| 2,085,129 | Stoewener | June 29, 1937 |
| 2,138,048 | Vesce | Feb. 25, 1941 |
| 2,093,454 | Kistler | Sept. 21, 1937 |
| 2,232,727 | Peterkin | Feb. 25, 1941 |
| 2,284,248 | Baker et al. | May 26, 1942 |
| 2,289,918 | Lee et al. | July 14, 1942 |
| 2,302,297 | Connolly | Nov. 17, 1942 |
| 2,384,943 | Marisic | Sept. 18, 1945 |

OTHER REFERENCES

Neuhausen et al., "Organogels of Silicic Acid," Jorunal American Chemical Society, vol. 43, 1921, pgs. 1844–1846.

Hatschek, Foundations of Colloid Chemistry, published by Benn (1925) page 99.

Certificate of Correction

Patent No. 2,455,445.  December 7, 1948.

MELVIN J. SEE ET AL.

It is hereby certified that errors appear in the printed specification of the above numbered patent requiring correction as follows:

Column 3, line 70, for the words "rupture of" read *rupture or*; column 4, line 38, for "practices" read *particles*;

and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*